United States Patent
Glenn (10) Patent No.: US 11,906,298 B1
(45) Date of Patent: Feb. 20, 2024

(54) TWO-PIECE UNIVERSAL ALIGNMENT TOOL AND METHOD FOR SERVICING MUD RECIPROCATING PUMPS

(71) Applicant: EW Pumps, LLC, Houston, TX (US)

(72) Inventor: James B. Glenn, Houston, TX (US)

( * ) Notice: Subject to any disclaimer, the term of this patent is extended or adjusted under 35 U.S.C. 154(b) by 0 days.

(21) Appl. No.: 17/898,336

(22) Filed: Aug. 29, 2022

(51) Int. Cl.
  *G01B 5/245* (2006.01)
  *B23Q 17/22* (2006.01)
  *G01B 5/252* (2006.01)

(52) U.S. Cl.
  CPC ......... *G01B 5/245* (2013.01); *B23Q 17/2258* (2013.01); *G01B 5/252* (2013.01)

(58) Field of Classification Search
  CPC ........... G01B 5/245; G01B 5/25; G01B 5/252
  USPC .................................................. 33/613, 645
  See application file for complete search history.

(56) References Cited

U.S. PATENT DOCUMENTS

| | | | | |
|---|---|---|---|---|
| 4,964,224 A * | 10/1990 | Jackson | ................... | G01B 5/25 33/645 |
| 5,185,937 A * | 2/1993 | Piety | ........................ | G01B 5/25 33/645 |
| 5,222,306 A * | 6/1993 | Neumann | ................. | G01B 5/25 33/645 |
| 6,616,429 B1 * | 9/2003 | Weber | ....................... | G01B 5/25 418/55.1 |
| 6,694,861 B2 * | 2/2004 | Glasson | ............... | H01R 13/521 33/763 |
| 8,997,365 B2 * | 4/2015 | Alexander | ............... | G01B 5/25 33/645 |
| 11,105,202 B2 * | 8/2021 | Ibrahim | ............... | G01B 11/272 |
| 11,650,048 B2 * | 5/2023 | Strunk | .................... | G01S 17/88 356/400 |
| 11,761,748 B1 * | 9/2023 | Bouzguenda | ............ | G01B 5/25 33/286 |

* cited by examiner

*Primary Examiner* — George B Bennett
(74) *Attorney, Agent, or Firm* — Karen B. Tripp (57) ABSTRACT

A method and apparatus for aligning a crosshead of a mud pump with the fluid end of the mud pump without having to remove the rod system (piston rod, extension rod) of the pump. The apparatus comprises a dial indicator which measures differential distance and a connection component for connecting the apparatus directly or indirectly to the crosshead. The method and apparatus allow the establishment of perpendicularity and concentricity of the crosshead with respect to the bore in the fluid end of the pump.

10 Claims, 12 Drawing Sheets

TWO-PIECE UNIVERSAL ALIGNMENT TOOL AND METHOD FOR SERVICING MUD RECIPROCATING PUMPS

FIELD

The present invention relates to mud pumps used in drilling wells (or boreholes) into subterranean formations, such as for example for the recovery of hydrocarbons, mining operations or utility and infrastructure conduit installation. The invention particularly relates to methods and apparatuses for aligning the crosshead section of mud pumps to the fluid end section of mud pumps.

BACKGROUND

Whether onshore or offshore, well drilling operations rely on a multitude of systems. A mud pump is an important part of the equipment used for oil well drilling. The mud pump is tasked with circulating drilling fluid under high pressure downhole. Also sometimes called a drilling fluid pump or a drilling mud pump or a mud drilling pump, a mud pump is typically a reciprocating piston/plunger pump designed to circulate drilling fluid at up to 1600 gpm under high pressure (up to 7,500 psi or 52,000 kPa) down the drill string and back up the annulus of the well.

A mud pump has two key sections: the power end and the fluid end. The power end of the pump will have critical parts called the crossheads and piston rods. The crosshead reciprocates in between upper and lower guide plates, motivating the piston rod to deliver driving force to the fluid end while maintaining linear motion for the pistons that displace and pressurize the fluids being moved. Ensuring that the piston operates smoothly in a constrained linear path is essential for the proper working of the mud pump. Proper alignment of the crosshead to the fluid end liner is necessary to maximize piston and liner life. Failure to achieve proper alignment, or misalignment, can result in vibration, excessive part wear (parts such as the crosshead, crosshead guides, piston, piston rod, liner, stuffing box and baffle), pump failure and higher maintenance costs.

A number of events can occur to cause need for alignment or re-alignment of the crosshead to the fluid end liner. For example, alignment is needed at the time of initial crosshead or piston rod installation in the mud pump. Re-alignment is sometimes needed after the pump has been serviced or after the pump liners have been changed (a normal process that is dictated by changes in operating pressure or volume requirements). Re-alignment is needed whenever the crosshead or crosshead guides are removed for inspection or replacement (due to wear). Re-alignment is needed anytime the extension rod, sub rod or piston rod are removed for inspection, repair, or replacement. Re-alignment is needed when misalignment is suspected due to observed vibration. Further, periodic preventive maintenance checking of the alignment is typical in drilling operations as part of a scheduled system maintenance program overall.

In general, crosshead alignment or re-alignment is required whenever the crossheads and/or crosshead guides are removed from the pumps. Before final re-assembly is undertaken the alignment to achieve perpendicularity and concentricity of these parts (the crosshead to the fluid end liner) must be re-established and positionally fixed. As used herein, the term "alignment" indicates perpendicularity or concentricity of the cross heads even though the objective of the entire alignment method is to have both perpendicularity and concentricity.

Traditional methods for achieving such alignment require that the piston rod be removed from the pump prior to doing the alignment. The piston rod is then replaced with a measuring device (such as, for example, un-calibrated wooden rods, Faro Arms and laser or physical micrometers) that allows alignment measurements to be conducted, such as checking the vertical and horizontal alignment of the piston rod outer diameter to the piston liner interior diameter. After the alignment measurements are taken, the measuring device is removed and the piston rod is re-installed. This method can induce alignment errors (post alignment procedure) since the actual piston rod is not in place when the alignment method is undertaken.

Common methodology and practice for aligning crossheads, piston rods, pistons and liners are highly dependent on the skills and experience of the technician performing the alignment. The technician must be competent not only in the mechanics and method of the alignment methodology but also competent in the use of the specific equipment being used to obtain the measurements as well as knowledgeable of the precision of the tools used in the alignment procedure. Electronic measurement devices including laser devices have their own error potential, and when employed, add a possible failure point (electronic malfunction) in the method.

One known technique that does not rely on electronic/laser measurements involves the use of thin metal "feeler gauges" which are used to measure the clearance between the outer surface of a piston and the interior surface of the pump liner being aligned. However, this method also induces errors because it requires tight clearance tolerances to be measured accurately on a curved surface with a poorly fitting tool. This method is also time consuming. Furthermore, alignment according to this method must be done on every cylinder of a pump. Mud pumps normally have 3-5 cylinders so time spent for this technique must be multiplied by the number of cylinders aligned.

Nevertheless, when not using a laser alignment tool, the technique of using thin metal "feeler gauges" in the curved gap between piston and liner is a commonly current practice to estimate the thickness of shims needed to achieve true alignment. This method can be highly inaccurate, resulting in longer times for adjustment and ultimately a lower accuracy alignment of these parts.

Current alignment practices require hundreds of pounds of equipment be available, and incur with that cost and expense for fabrication and transport. Also, whenever work is performed within the confines of a mud pump, health, safety and environmental (HSE) risks are present. Examples of these HSE risks include but are not limited to: confined spaces, awkward positions, and limited leverage. Piston rods are heavy, often weighing up to nearly 100 lbs. in mud pumps used in oil well drilling. There is a need to eliminate the HSE risks associated with lifting and removal of the piston rods.

SUMMARY

The present invention provides a method for aligning a crosshead in a reciprocating pump to a fluid end section of the pump. In addition to the crosshead and the fluid end section, the pump comprises: a crosshead guide; a pump fluid module having associated therewith or therein a pump liner and a piston having a piston rod; an extension rod; and optionally one or more shims. The method comprises the following steps:

(a) removing said pump liner and said piston from a pump fluid module;
(b) affixing an alignment tool to said piston rod in the pump fluid module;
(c) affixing a measurement device to the alignment tool;
(d) using the measurement device to acquire measurements indicative of perpendicularity or concentricity of one or more of the group: i) the crosshead; ii) the crosshead guide; iii) the piston rod; iv) the extension rod; v) the pump fluid module.
(e) adding or removing one or more shims to achieve more precise concentricity or perpendicularity of one or more of the group: i) the crosshead; ii) the crosshead guide; iii) the piston rod; iv) the extension rod; v) the pump fluid module.

The invention further provides an apparatus for conducting the method of the invention or otherwise aligning a crosshead with a fluid module, and particularly for aligning a crosshead associated with the power end of a reciprocating pump with the fluid end of the pump. The apparatus comprises a connection assembly and a calibrated dial indicator assembly that allows the establishment of the perpendicularity and concentricity of the crosshead with respect to the fluid end of the pump, without having to remove the existing piston rods associated with the pump.

BRIEF DESCRIPTION OF THE DRAWINGS

The present invention will be better understood by referring to the following detailed description of preferred embodiments and the drawings referenced therein, in which.

LIST OF ELEMENTS IN DRAWINGS

14 Upper Crosshead Guide
16 Lower Crosshead Guide
18 Nut Plate
22 Crosshead
24 Extension rod
26 Shims
28 Piston Rod
32 Clamp (position) for attaching the Extension Rod 24 to the Piston Rod 28
34 Connection Assembly of the Universal Alignment Tool of the invention
36 Dial Indicator Assembly of the Universal Alignment Tool of the invention
37 Dial Indicator
38 Pump Power Frame, which is the body of the pump power end
42 Crosshead Guide Retaining Bolt
44 Pump Fluid Module (or Liner Retention Flange)
46 Liner Retainer Area
48 Engineered Bearing
52 Integrated Rotating Cap of Dial Indicator Assembly 36 of the Universal Alignment Tool
54 Piston
56 Centerline of the Piston Rod 28 (motion of direction)
57 Threaded holes (one hole with imperial threads and one hole with metric threads) for receiving Post 59 for attachment to Dial Indicator Assembly 36
58 Alignment "Pin" on Connection Assembly 34 for attachment of Engineered Bearing 48 and Integrated Rotating Cap 52
59 Post for Dial Indicator Attachment
60 Vent Port
61 Pump Liner
62 First Spirit Level
63 Vent Port
64 Second Spirit Level
68 Front Retention Points
72 Back Retention Points
73 Liner Retention Flange
74 Liner Retention Nut
75 Piston Retainer Nut

DETAILED DESCRIPTION

The present invention provides an apparatus and method (or process) for easy and accurate alignment of the crosshead section of a mud pump to the fluid end section of a mud pump. For such alignment, the invention advantageously minimizes need for access to the pump and the internal workings of the pump and eliminates altogether the need to lift and remove piston rods, which can weigh up to nearly 100 lbs. The invention's minimal access requirements and ability to accomplish or effect alignment without removing the piston rods (and using the actual pump pails in checking the alignment) significantly reduces HSE risks that result from or are associated with piston rod removal and working in confined spaces, awkward positions and with limited leverage, which are characteristic features of the surroundings or environments in which mud pumps operate. Complicated equipment such as lasers requiring specialized training of technicians are also not needed with the apparatus and method of the invention.

The apparatus and method of the present invention advantageously allow all alignment measurements to be taken with the mud pump system assembled, avoiding any errors from re-assembly of the piston rod and extension rod. Further the invention significantly mitigates the HSE risk associated with the lifting and handling of the piston rods and clamps.

The apparatus and method of the invention also substantially reduces the time required to effect the alignment or realignment and significantly reduces the skill level and training required to make this critical adjustment. That is, the invention allows time to be saved by eliminating the need for piston rod removal and re-installation. The invention also saves time by using a simple Certified Dial Indicator (also called a "dial indicator" or "dial indicator 37" herein) which makes taking direct measurements quick, easy and easily checked and which does not require a technician to have skills or training on any electronic devices such as lasers to perform the method.

By not using sophisticated electronics, which are inherent to taking laser measurements, the invention substantially simplifies the method of alignment and removes electronics failure or 'black box' points. The dial indicator used in the present invention measures differential distance. Lasers measure absolute distances, but in an alignment method, such absolute distances are converted into differential distances relative to a reference. Thus, it is possible to substitute a laser distance measurement or other electronic distance measurement device for the dial indicator of the invention. However, the dial indicator used in the invention gives direct measurements and is superior because of its simplicity and robustness in field conditions.

The apparatus of the invention is light in weight and can be handled safely by a single technician. One embodiment of the apparatus of the invention can be used on many different pumps, reducing the amount of equipment required to service a variety of different pumps.

Figure 1:
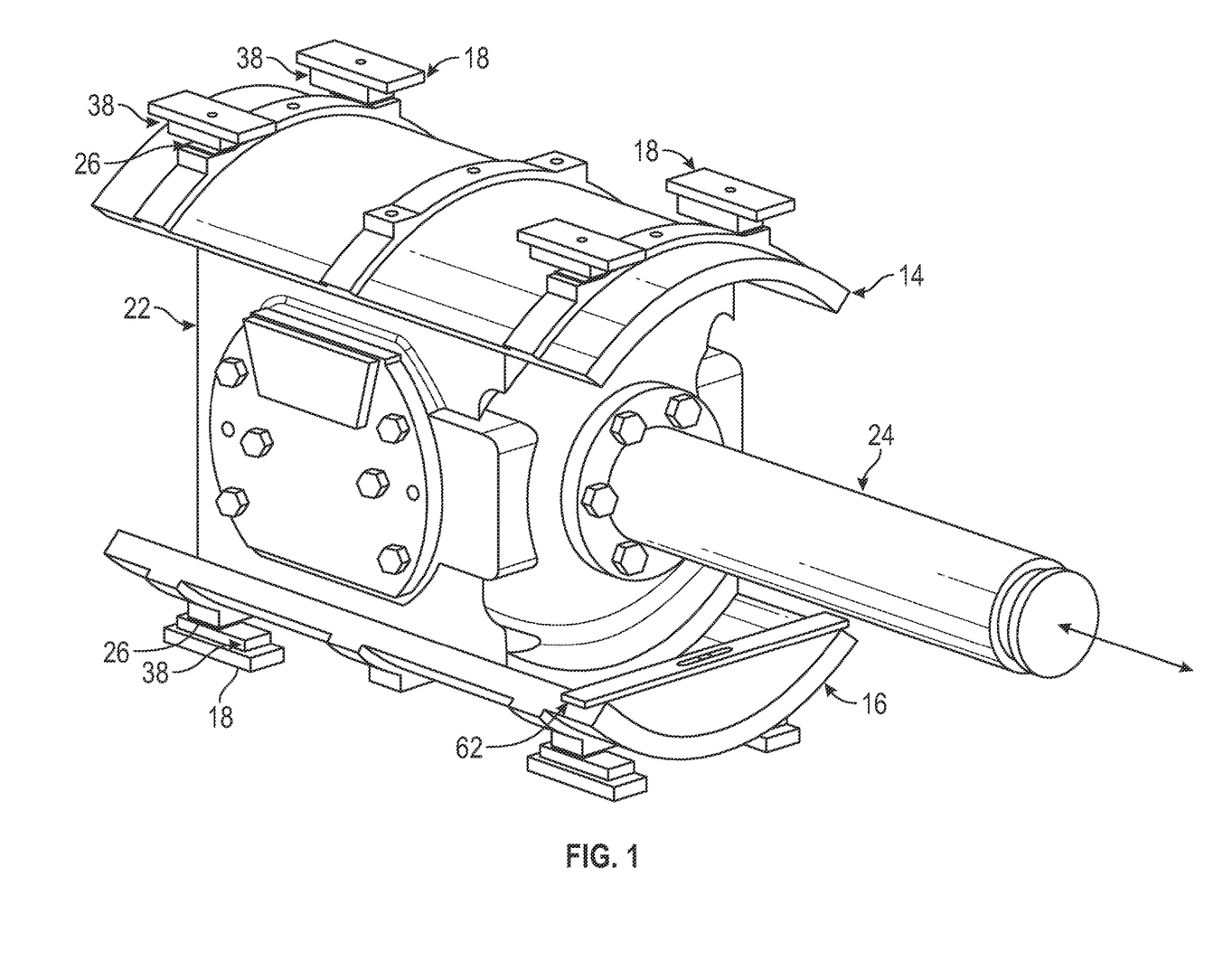
FIG. 1 is a schematic of the general layout of one embodiment of a crosshead and a crosshead guide system of a mud pump.

FIG. 1 provides a schematic of a general layout of a mud pump crosshead 22 and crosshead guide system comprising an upper crosshead guide 14 and a lower crosshead guide 16, for illustration of use of the present invention. The crosshead 22 slides on the lower crosshead guide 16 and is kept in position by the lower crosshead guide 16 and the upper crosshead guide 14 in a linear fashion. The upper crosshead guide 14 and the lower crosshead guide 16 provide a smooth guide system that ensures the motion of the crosshead 22 is constrained to a non-rotating, non-vibrating linear motion.

Figure 3:
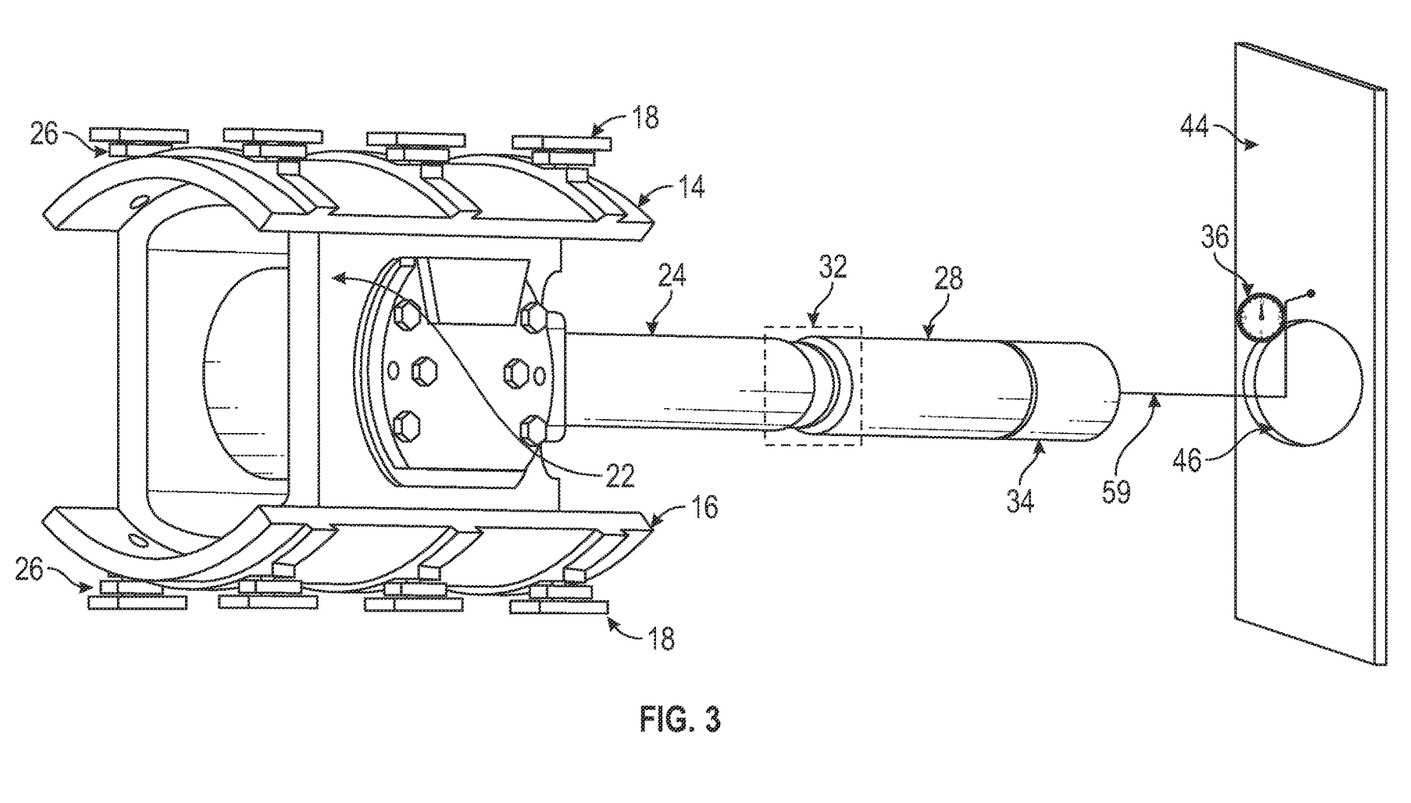
FIG. 3 is a schematic of the layout of the crosshead and crosshead guide system of FIG. 1 with the apparatus of the present invention installed for measuring and establishing perpendicularity of the crosshead-extension rod-piston with the pump fluid module.
Figure 4:
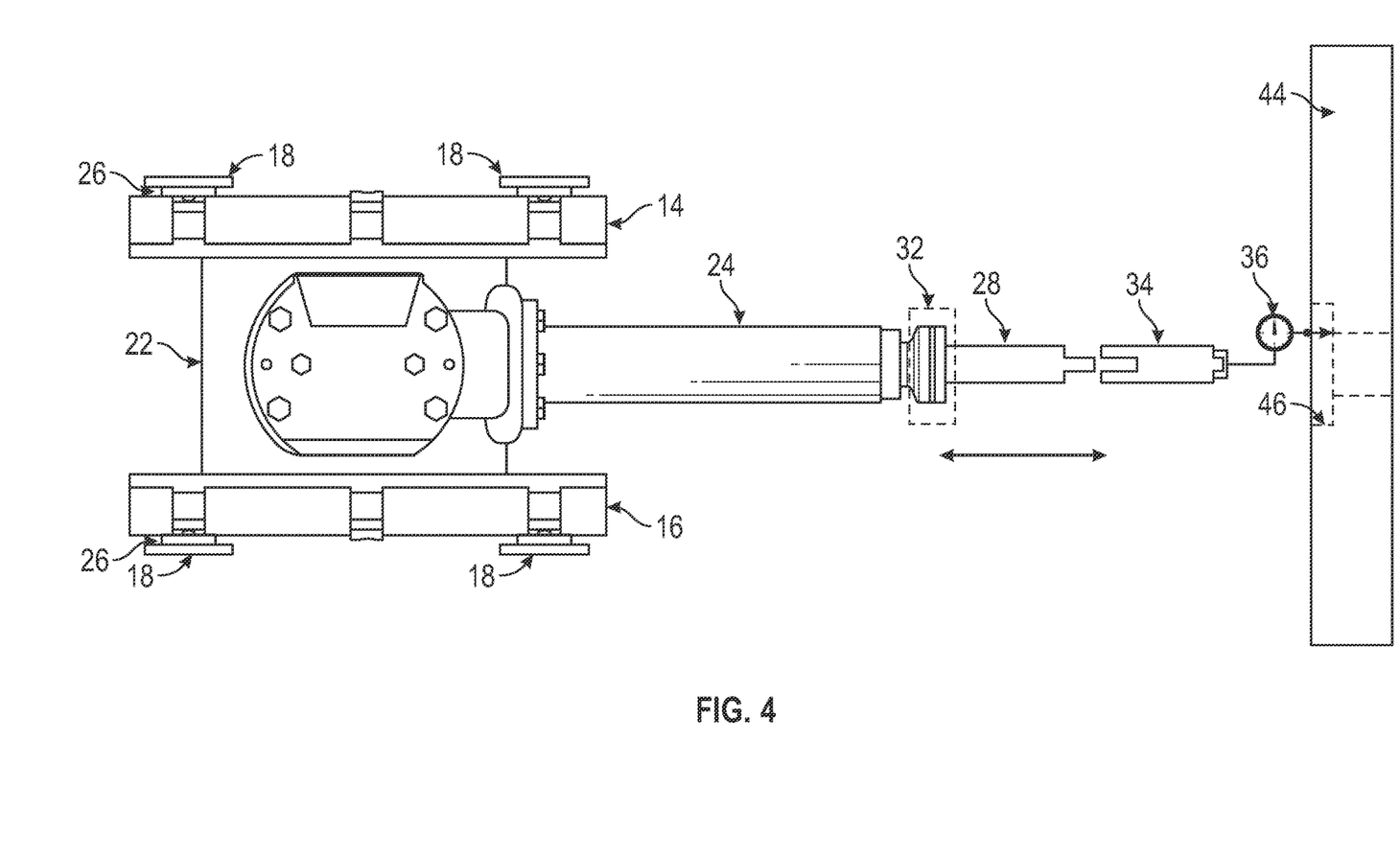
FIG. 4 is a side view of the layout of the crosshead guide system of FIG. 3 showing the installed apparatus of the present invention from a side view, for measuring and establishing perpendicularity of the crosshead-extension rod-piston with the pump fluid module.
Figure 9:
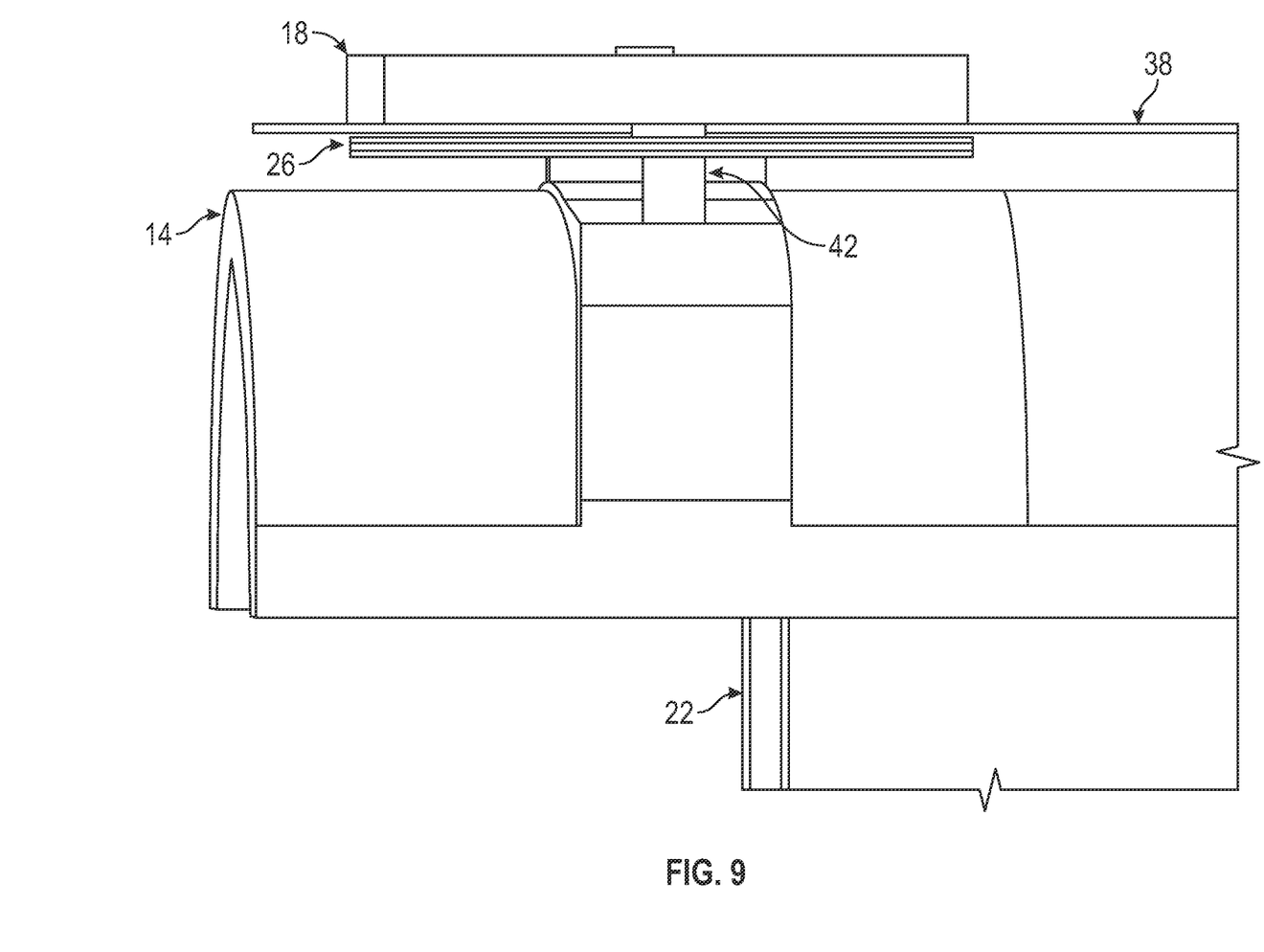
FIG. 9 is a schematic enlarged side view showing the position of the crosshead guide, the nut plate, shims, the power frame and the crosshead of FIG. 1.
Figure 10:
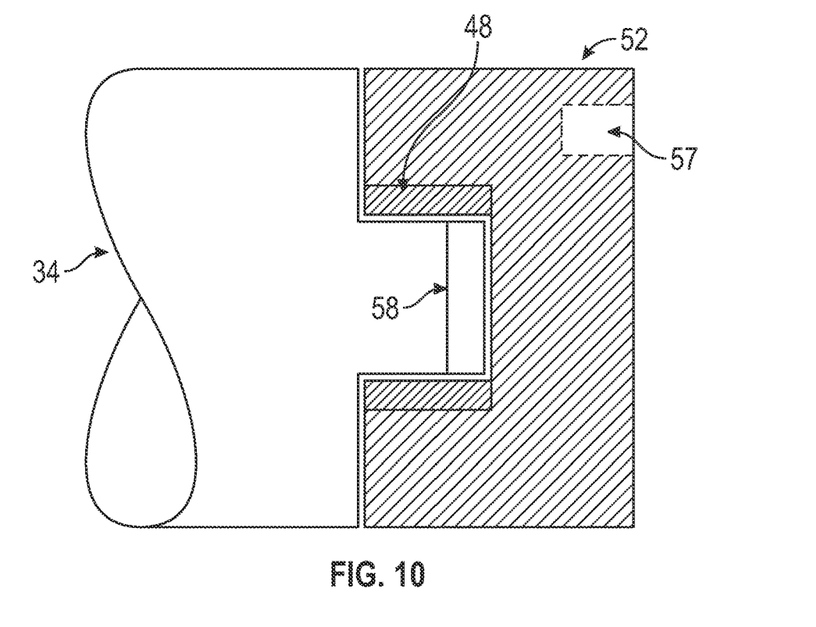
FIG. 10 is a schematic of the alignment "pin" on the connection assembly.
Figure 13:
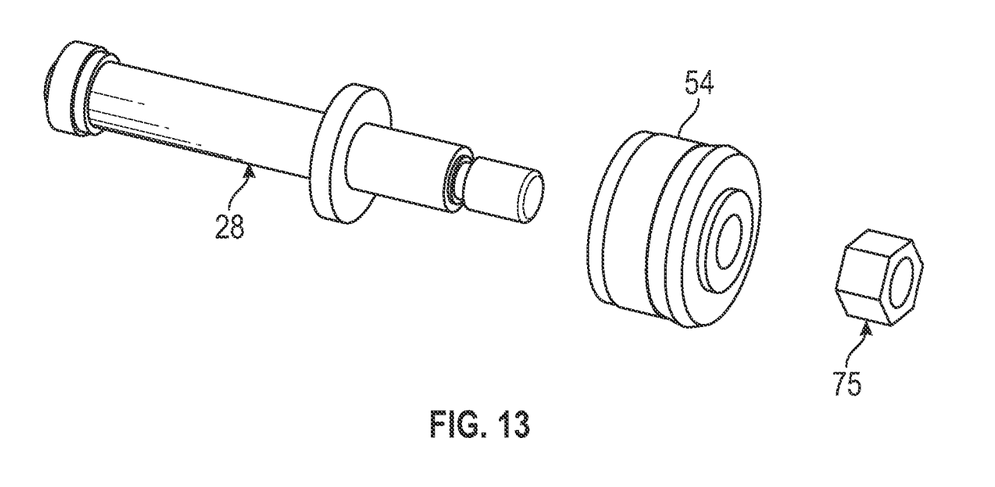
FIG. 13 is an exploded or blown apart view schematic of the piston rod, piston, and piston retainer nut of a mud pump.

The schematics in FIGS. 1, 4, and 9 also show the shims 26 in place for positioning the crosshead guides 14 and 16 within the pump power frame 38, which is the body of the pump power end, shown in FIG. 9. FIG. 1 also shows the extension rod 24 which is connected to the crosshead 22 to transmit the linear crosshead 22 motion to the piston rod 28 shown in FIGS. 3, 4, 6 and 7 and piston 54 shown in FIG. 13.

FIG. 9 shows an enlarged schematic of a side view of the top portion of the mud pump crosshead 22 and crosshead guide system shown in FIG. 1, showing in more detail how the upper crosshead guide 14 is affixed to the crosshead 22. Nut plate 18 acts as a "threaded nut" in conjunction with a crosshead retaining bolt 42 to provide a fastening system for retaining the crosshead guides 14 (and 16, not shown in this FIG. 9) to the pump power frame 38. The number of nut plates 18 for the upper crosshead guide 14 (and the lower crosshead guide 16 not shown in FIG. 9) will vary with model or embodiment of mud pump, but typically at least four nut plates 18 are used per upper crosshead guide 14 (and typically at least four nut plates 18 are used per lower crosshead guide 16).

Figure 5:
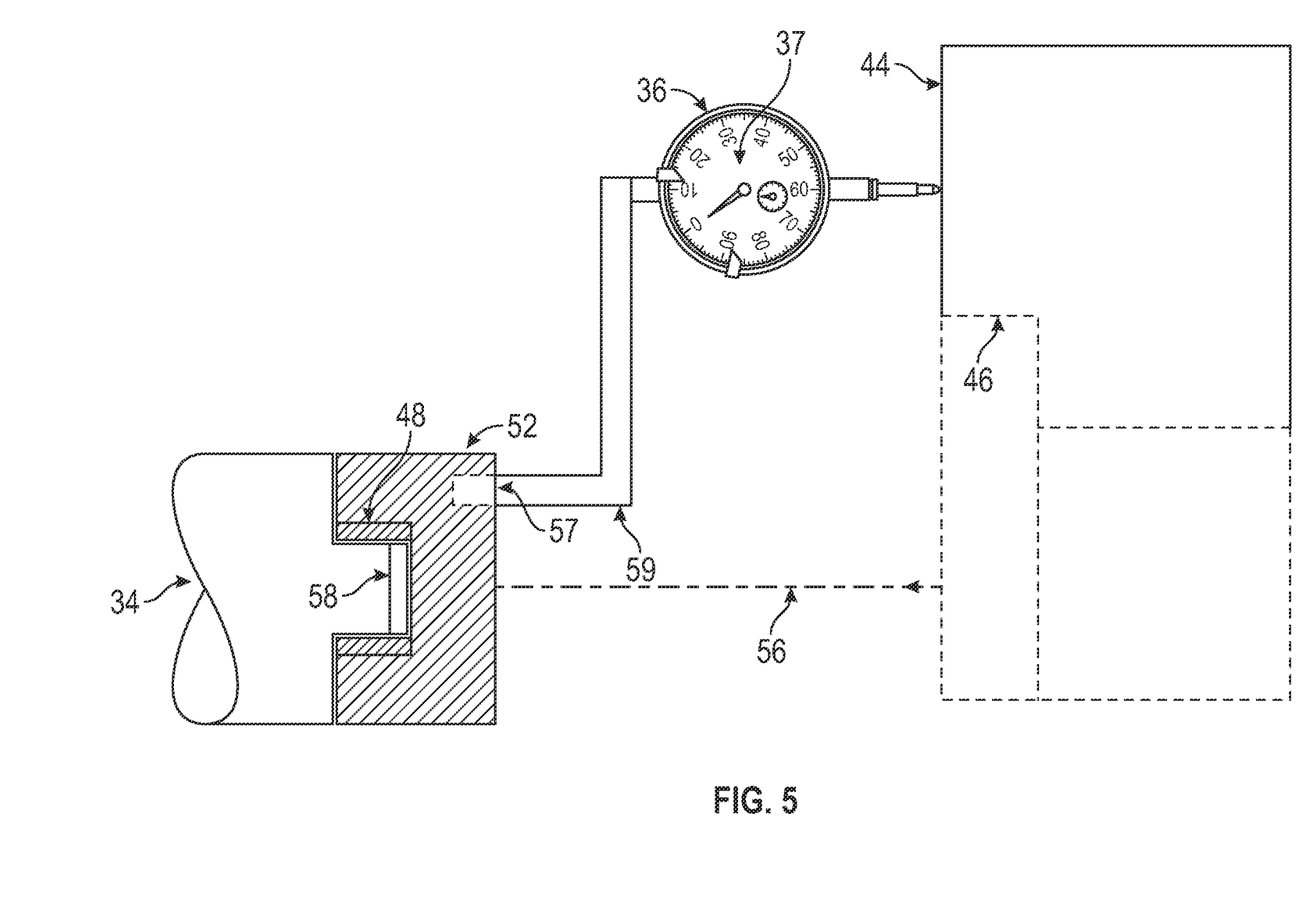
FIG. 5 is a schematic enlarged side view of the apparatus of the invention and the dial indicator of FIG. 4 as used to measure and establish perpendicularity, at the 12 o'clock position.
Figure 6:
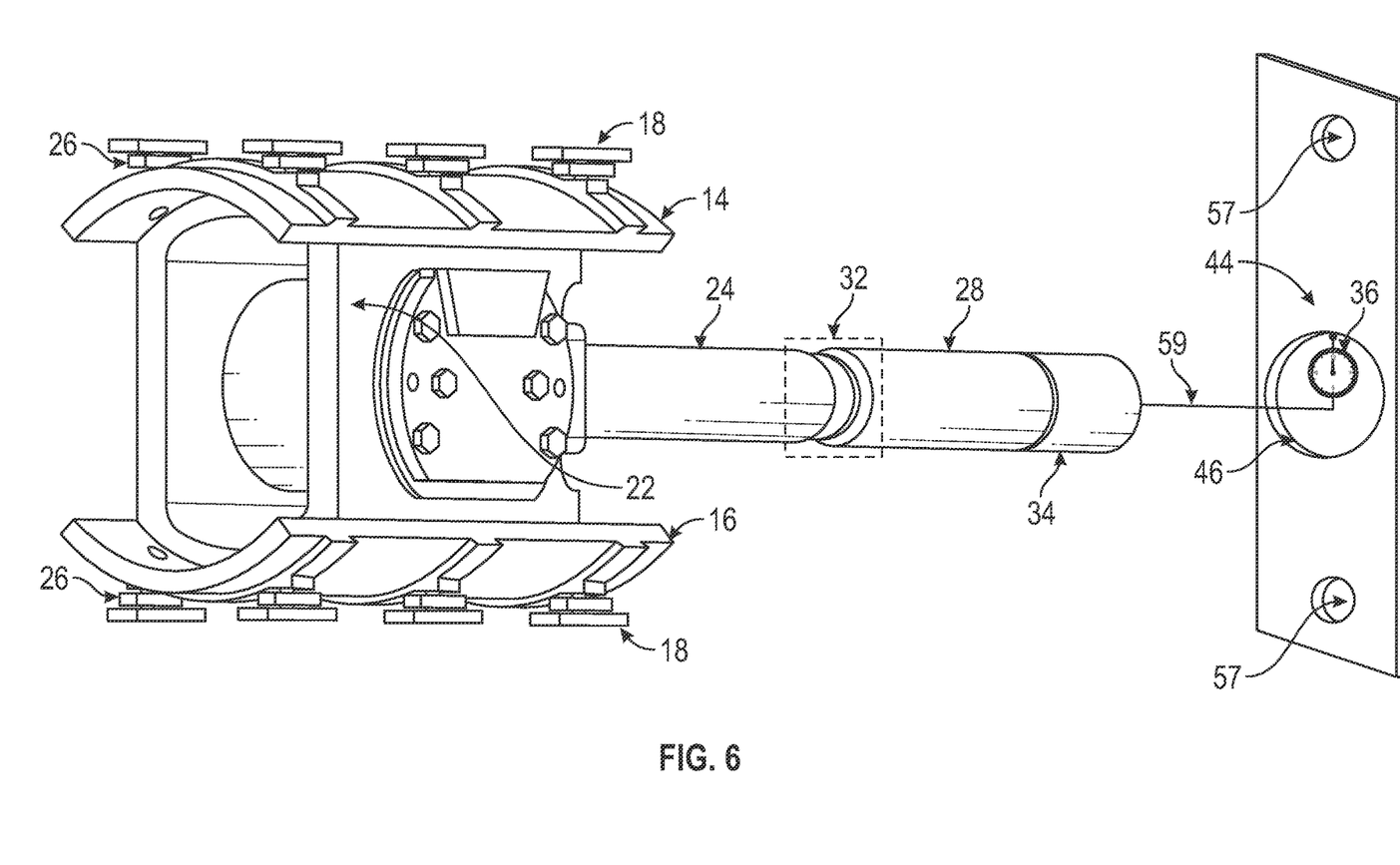
FIG. 6 is a schematic of the layout of the crosshead and crosshead guide system of FIG. 1 and FIG. 3 but with the apparatus of the present invention installed for measuring and establishing concentricity of the crosshead-extension rod-piston with the pump fluid module.
Figure 7:
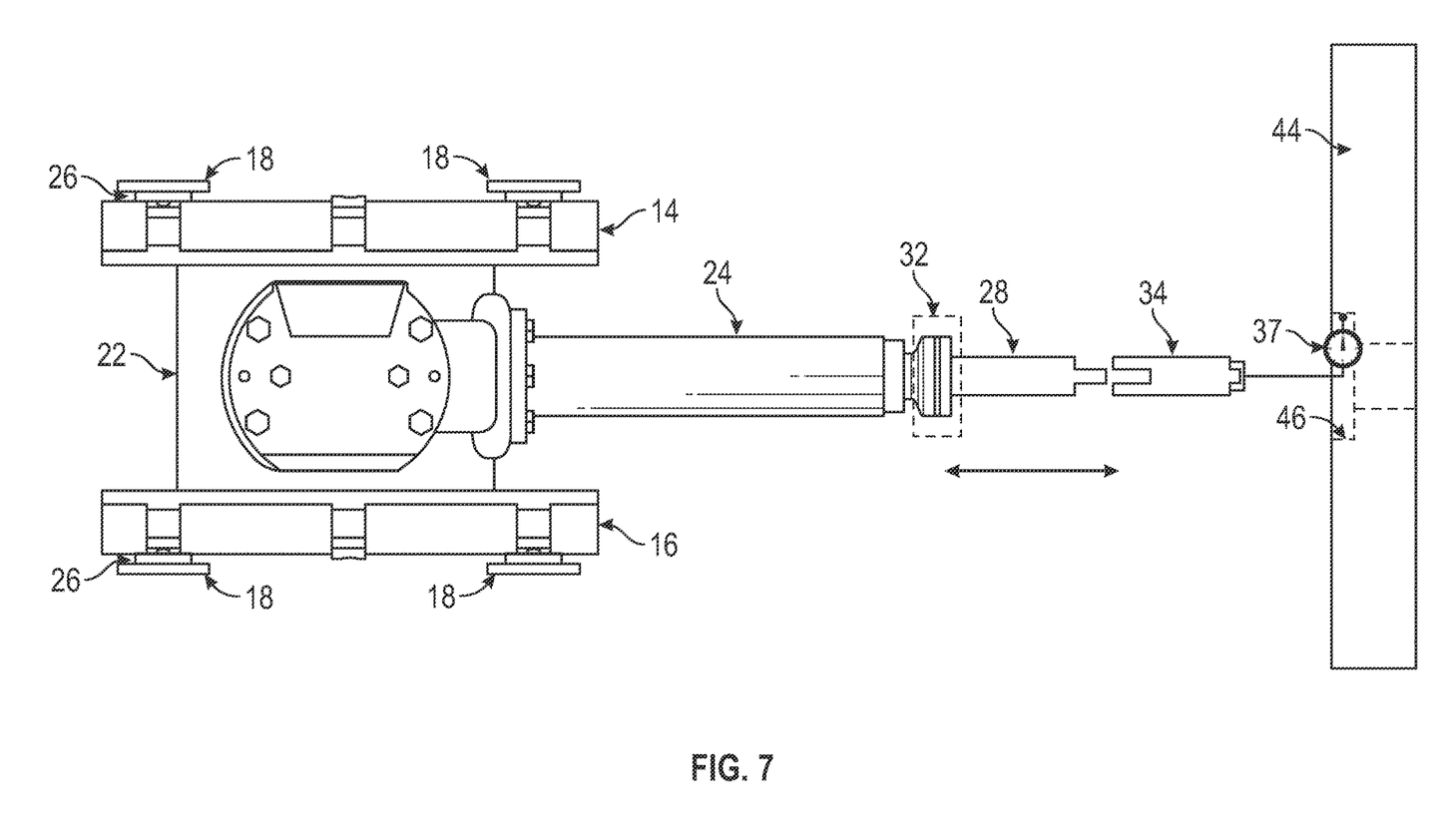
FIG. 7 is a schematic of the layout of the crosshead and crosshead guide system of FIG. 1 and FIG. 4 but with the apparatus of the present invention installed for establishing and measuring concentricity of the crosshead-extension rod-piston-dial indicator with the pump fluid module. The probe on the dial indicator is positioned to make contact with the outer bore face of the liner seat area on the pump fluid module that faces the piston rod.
Figure 8:
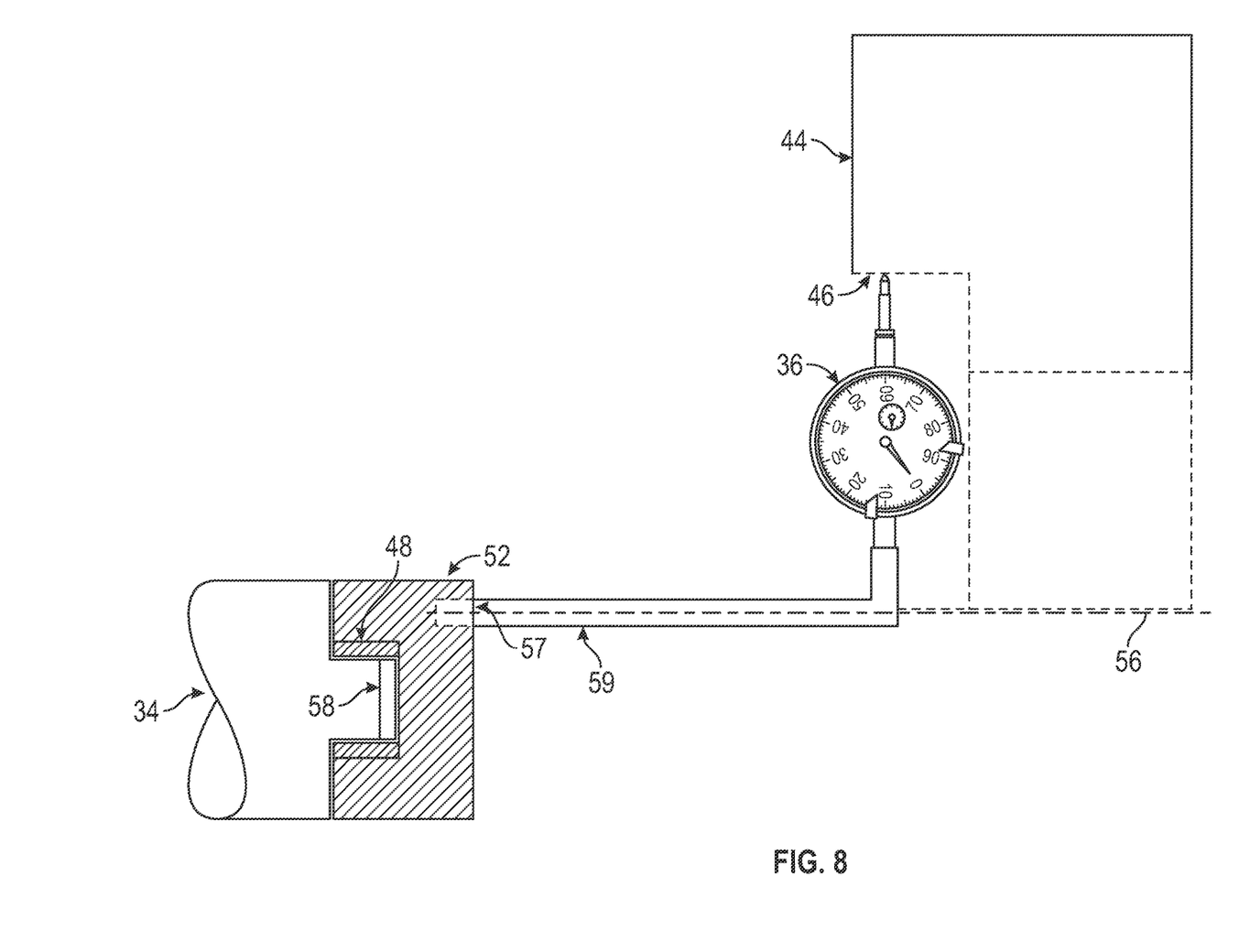
FIG. 8 is a schematic enlarged side view of the apparatus of the invention and the dial indicator of FIG. 7 as used to measure and establish concentricity, at the 12 o'clock position.
Figure 11:
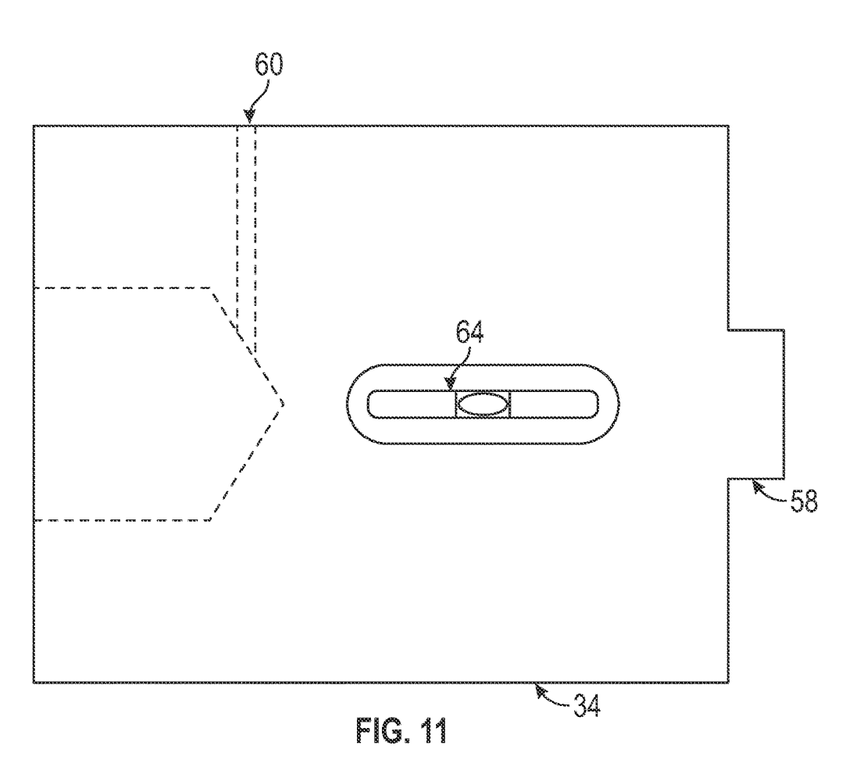
FIG. 11 is a schematic of a second spirit level on the connection assembly of the Universal Alignment Tool of the invention.

The apparatus of the invention, which is called herein a two-piece universal alignment tool, comprises a connection assembly 34 and a dial indicator assembly 36, as shown in FIGS. 2-8. The connection assembly body 34 with an integrated rotating assembly connects to the piston rod 28, in one embodiment by having a concave or female end that is threaded onto the male threaded stud end of the piston rod 28. The "female end of the connection body 34 has a pressure vent 60, as shown in FIG. 11, to ensure the connection assembly base 34 fits accurately, without 'hydraulic lock' to the piston rod 28. The dial indicator assembly 36 is comprised of a dial indicator 37, a machined post 59 for attachment to the integrated rotating cap on assembly 34 and an engineered bearing 48 which allows for free rotation of the dial indicator assembly 36 around the centerline 56 of the piston rod 28 (or concentric to the piston rod 28), as shown in FIGS. 5 and 8. A dial indicator post 59 extends from the integrated rotating cap on assembly 34 to support the dial indicator 37 and such dial indicator post 59 can have various lengths and brackets for correct positioning.

The rotating cap assembly 34 incorporates a press fit engineered bearing 48 that is fit to the machined post 59. The machined post 59 will center and fix the rotating cap assembly 34 keeping dial assembly indicator 36 in a position that is both concentric and perpendicular to the piston rod 28, as shown in FIGS. 5, 7, 10 and 11.

The term "dial indicator" as used herein has the common definition of a dial indicator that provides a dial display similar to a clock face with clock hands which point to graduations in a circular scale on the dial that represent the distance of the probe tip from a zero setting. Such dial indicators can be used to check for variations in tolerance during an inspection process of a machined part, and to measure the deflection of a beam or ring under laboratory conditions, as well as used in many other situations when a small measurement needs to be registered or indicated. Dial indicators typically or commonly measure ranges from 0.025 mm to 300 mm (0.001 inch to 12.0 inches), with graduations of 0.001 mm to 0.01 mm (metric) or inches to 0.001 inches (imperial/customary). The precision of the required dial indicator for use in one embodiment of the present invention is $1/1000^{th}$ of an inch.

FIGS. 3 and 4 provide schematics of the layout showing the two-piece apparatus of the invention in position, attached to the piston rod 28, for establishing perpendicularity of the crosshead 22-extension rod 24-piston 54 with the pump fluid module 44 according to the steps of the invention. FIG. 5 provides an enlarged schematic of the dial indicator assembly 36 as shown in FIGS. 3 and 4, as it is attached to the integrated rotating cap 52 and positioned adjacent the pump fluid module 44.

The pump fluid module 44 is the pressure containing part of the mud pump. The pump fluid module 44 is typically machined from a block of high strength steel (or other material with similar characteristics) and contains high pressure valves and associated equipment that permit the mud pump to raise the pressure of the fluid being processed from ambient pressure to many thousands of psi. Typically, the pump fluid module 44 is bolted to the pump power frame 38, which is the body of the pump power end. Such bolting in understood by one of ordinary skill in the art and thus the bolts are not shown in the Figures.

Figure 12:
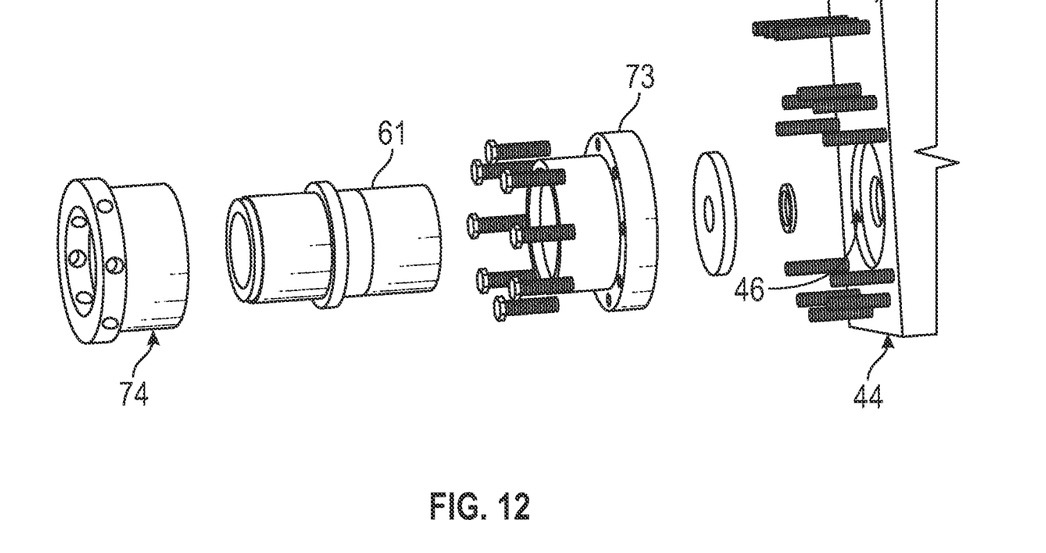
FIG. 12 is an exploded or blown apart view of the schematic of pump liner and the liner retention system with a fluid module (or the liner retention flange) of a mud pump.
Figure 14:
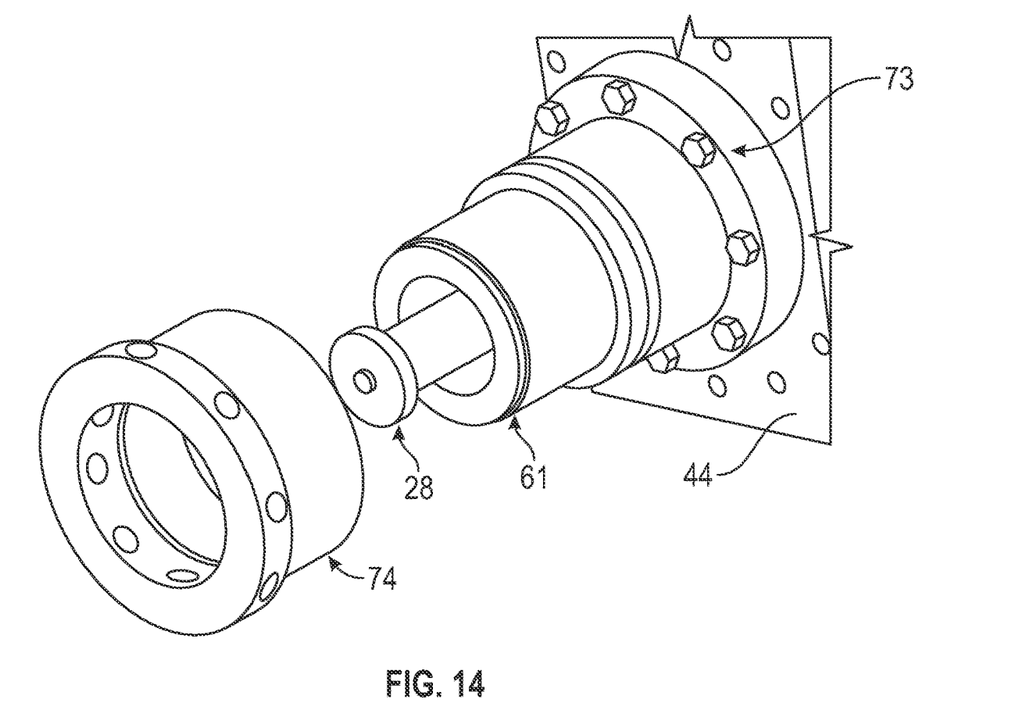
FIG. 14 is an exploded or blown apart view schematic of a liner retention assembly showing the piston, pump liner and the pump fluid module (or the liner retention flange) of a mud pump.
Figure 15:
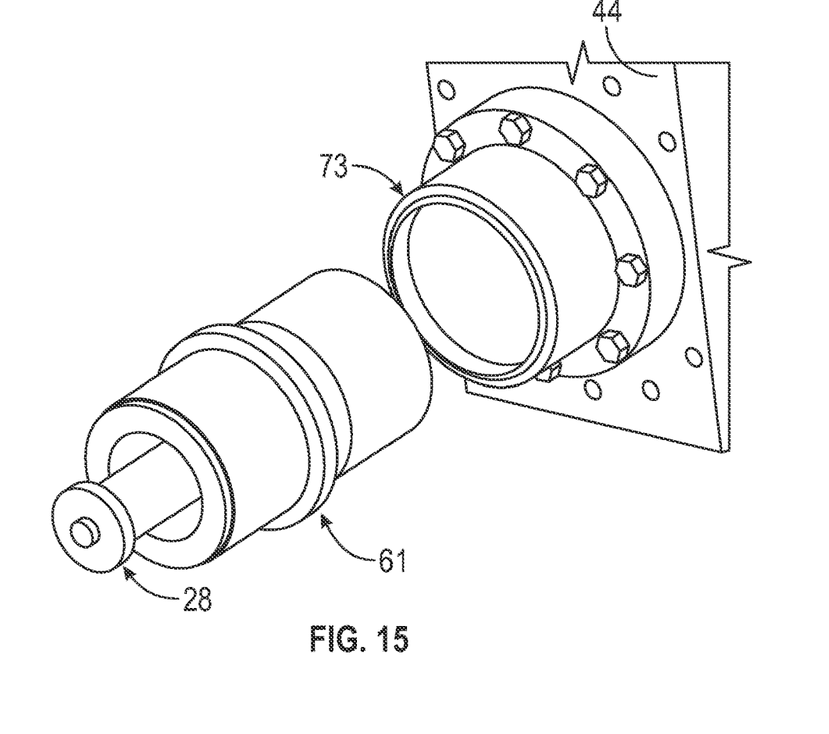
FIG. 15 is the exploded or blown apart view of the liner retention assembly of FIG. 14 with the liner retention nut removed.

FIG. 5 shows the liner retainer area 46 which is a machined cylindrical indentation in the pump fluid module 44. This liner retainer area 46 provides a sealing interface between a pump liner 61 and the pump fluid module 44, shown in FIGS. 12, 14, and 15. On some pumps there is a liner retention flange 73 that is a high tolerance flange that is bolted to the pump fluid module 44, as shown in FIGS. 12, 14, and 15. The liner retention flange 73 can be used for the concentricity and perpendicularity measurements discussed below the same as the pump fluid module 44 if it is present. As used herein, the number "44" can thus also be understood to refer to a liner retention flange 73 for purposes of the concentricity and perpendicularity measurements according to the invention.

FIGS. 6 and 7 provide schematics of the layout showing the apparatus of the invention in position, attached to the piston rod 28, for establishing concentricity of the crosshead 22-extension rod 24-piston 54 with the pump fluid module 44, according to the steps of the invention. FIG. 8 provides an enlarged schematic of the dial indicator assembly 36 as shown in FIGS. 6 and 7, as it is attached to the integrated rotating cap 34 and positioned adjacent the pump fluid module 44.

Using the apparatus of the invention, comprising the connection assembly 34 and the dial indicator assembly 36, for alignment of the crosshead 22 of a mud pump to the pump fluid module 44 of the mud pump, the method of the invention comprises the steps discussed below for establishing both perpendicularity and concentricity.

Step 1: Remove the pump liner 61 and piston 54 from the pump fluid module 44, so that the liner retainer area 46 is accessible for making alignment measurements with the dial indicator assembly 36 of the apparatus of the invention. FIG. 3 illustrates how the crosshead 22-extension rod 24-piston rod 28 looks after the pump liner 61 and piston 54 are removed.

Step 2: Remove all shims 26 from the lower crosshead guide 16, retighten the crosshead retention bolts 42 (FIG. 9). Place a first spirit level 62 (FIG. 1) on the lower crosshead guide 16 to ensure the pump is level before starting the alignment. The pump must be level before alignment begins. Level the pump if necessary. FIG. 1 shows the lower crosshead guide 16's flat exposed section that is suitable for such placement of the first spirit level 62. The positioning of shims 16 and the crosshead retention bolts 42 with respect to the lower crosshead guide 16 is similar to that shown in FIG. 9 for the positioning of the shims 26 and the crosshead retention bolts 42 with respect to the upper crosshead guide 14. (Guide ribs not shown for clarity).

Step 3: Install connection assembly 34 onto the piston rod 28 using the existing threaded profile on the end of the piston rod 28. (Typically, the piston rod 28 has such a threaded profile on said end because the pump piston 54 is retained on that end with a nut). (Note: connection assembly 34 must be attached tightly to ensure proper tool alignment). The connection assembly 34 includes a second spirit level 64 (See FIG. 11) and installation of the connection assembly 34 onto the piston rod 28 should be such that said second spirit level 64 is mounted parallel to the longitudinal axis of the piston rod 28. Check that the second spirit level 64 confirms that the connection assembly 34 is level. If not, then correct by re-leveling the mud pump, and particularly the crosshead 22, with one or more shims 26.

Step 4: Attach the dial indicator assembly 36 to assembly 34, using post for dial indicator assembly 59 and dial indicator 37 (FIG. 5).

Figure 2:
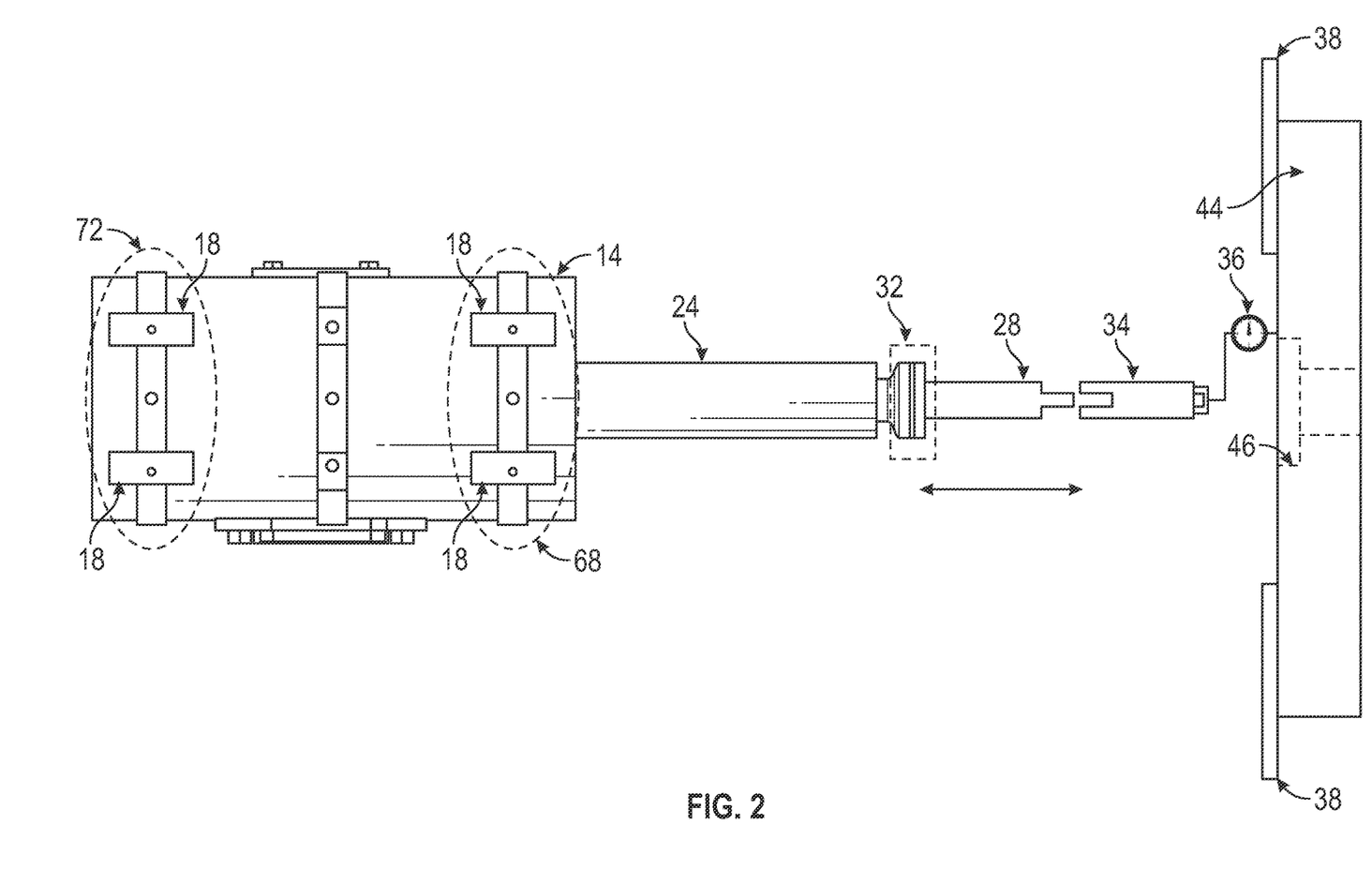
FIG. 2 is a top view of the crosshead-extension rod-piston of the mud pump of FIG. 1.

Step 5: Establish the PERPENDICULARITY of the piston rod 28 with the front face of the pump fluid module 44, as shown in FIG. 2.

That is, position the probe of the dial indicator assembly 36 so that it contacts the flat face of the pump fluid module 44 that is facing the piston rod 28, as shown in FIG. 5. Starting at the 12 o'clock position on the dial indicator assembly 36, as shown in FIG. 5, proceed by zeroing the dial indicator 37. Rotate the dial indicator assembly 36 around the circumference of the liner retention area 44 to the 3 o'clock, 6 o'clock and 9 o'clock positions, recording the dial indicator 37 readings at each said position.

If, for example, the 6 o'clock measurement shows a negative difference from the 12 o'clock reading, then the rear retention points 68 on the lower crosshead guide 16 need to be raised. The same number of shims 26 should be added to each side of the front retention points 68. FIGS. 1 and 9 show typical positioning of the shims 26 beneath the crosshead 22. Because mud pump geometry varies by model or embodiment, the adjustment described above is done iteratively with a suggested starting value of ½ the difference between the 12 o'clock and 6 o'clock measurements. Make the adjustment and retake the measurements. Repeat until the piston rod 28 is perpendicular to the face of the pump fluid module 44.

Once all adjustments have been completed and perpendicularity is established for the liner retainer area 46 (or pump cylinder of the pump fluid module 44), record all shims 26 added or subtracted from each retention point 68.

Step 6: Establish the CONCENTRICITY of the piston rod 28 with the centerline 56 of the piston rod 28 direction of motion, as illustrated in FIG. 6.

Position the dial indicator assembly 36 probe so that it contacts the inside surface of the liner retainer area 46, as illustrated in FIGS. 7 and 8. Rotating the dial indicator assembly 36 clockwise, take measurements at 12:00, 09:00, 6:00 and 3:00, noting the dial indicator assembly 36 results. CONCENTRICITY is achieved by raising the upper crosshead guide 14 and/or the lower crosshead guide 16 with the same number of shims 26 in both the front and back attachment points 68 and 72 respectively, as shown in FIG. 2. The front and back retention points are on both the upper and lower crosshead guides 14 and 16.

FIGS. 6, 7 & 8 show the position of the dial indicator assembly 36 with respect to the bore of the pump fluid module 44. During this measurement, beginning in the 12 o'clock position is suggested. Adjust the lower crosshead guide 16 by adding or removing shims 26 evenly (front and rear) to raise/lower the lower crosshead guide 16.

Repeat measurements until concentricity is confirmed. Once perpendicularity and concentricity are established for a piston rod system, move to the remaining piston rod systems and repeat until all rods are completed.

The above description of one embodiment of the invention is for illustration of the invention. Variations can be made in elements with similar or equivalent features or characteristics within the scope of the invention contemplated and described herein. For non-limiting examples: multiple dial gauges could be used; different rod connections for the connection assembly 34 could be used to fit a wider variety of pumps; remote reading of dial indicator 37 or dial gauges could be used to make it easier to read and record the dial reading; measurements could be fully recorded to document alignment; automation of dial readings and recordings could be installed; and digital dials could be used. Moreover, the invention has been described for use with a mud pump. However, crossheads and crosshead guides can be found in "non-pump" equipment as well. The apparatus of the invention could be suitable for these other applications with little or no modification to the method described herein.

While preferred embodiments of the present invention have been described, it should be understood that other various changes, adaptations and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A method for aligning a crosshead in a reciprocating pump to a fluid end section of the pump, wherein the pump further comprises: a crosshead guide; a pump fluid module having associated therewith or therein a pump liner and a piston having a piston rod system which moves a piston in a linear motion, by use of a piston rod; an extension rod; and optionally one or more shims;

the method comprising the steps of:
 (a) removing said pump liner and said piston from a pump fluid module;
 (b) affixing an alignment tool to said piston rod;
 (c) affixing a measurement device to the alignment tool;
 (d) using the measurement device to acquire measurements indicative of perpendicularity or concentricity of one or more of the group: i) the crosshead; ii) the crosshead guide; iii) the piston rod; iv) the extension rod; v) the pump fluid module;
 (e) adding or removing one or more shims to achieve more precise concentricity or perpendicularity of one or more of the group: i) the crosshead; ii) the crosshead guide; iii) the piston rod; iv) the extension rod; v) the pump fluid module.

2. The method of claim 1 wherein the measurement device is selected from the group: i) a dial indicator measuring differential distances; ii) a laser measurement device measuring absolute distances; or, iii) a mechanical feeler gauge.

3. An apparatus for use in the method of claim 1, comprising a dial indicator which measures differential distance and a connector for connecting the apparatus directly or indirectly to the crosshead.

4. An apparatus for alignment of a crosshead associated with a piston to a fluid module, said apparatus comprising a connection assembly and a dial indicator assembly that allows establishing perpendicularity and concentricity of said crosshead with respect to said fluid module without having to remove said piston rod.

5. The apparatus of claim 4 wherein the piston rod has a male end and the connection assembly connects to said the piston rod by having a female end that is threaded onto said male end of the piston rod.

6. The apparatus of claim 4 wherein the piston rod has a center line and the dial indicator assembly comprises a dial indicator, a post for attachment to the connection assembly, and an engineered bearing which allows free rotation of the dial indicator assembly around the center line of the piston rod.

7. The apparatus of claim 6 wherein the engineered bearing is press fit to the connection assembly and to the integrated rotating cap, providing for a metal to metal connection.

8. The apparatus of claim 7 wherein the dial indicator assembly further comprises a post attached to the integrated rotating cap of the connection assembly.

9. The apparatus of claim 8 wherein the post for the dial indicator attachment fixes the dial indicator assembly in a position that is both concentric with and perpendicular to the piston rod.

10. The apparatus of claim 9 wherein the precision of the dial indicator assembly in measuring differential distance is $1/1000^{th}$ of an inch.

* * * * *